(12) United States Patent
Lee et al.

(10) Patent No.: US 12,055,142 B2
(45) Date of Patent: Aug. 6, 2024

(54) SCROLL COMPRESSOR

(71) Applicant: Hanon Systems, Daejeon (KR)

(72) Inventors: Kyung Jae Lee, Daejeon (KR); Jeong Ki Seo, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 17/753,614

(22) PCT Filed: Feb. 10, 2021

(86) PCT No.: PCT/KR2021/001769
§ 371 (c)(1),
(2) Date: Mar. 9, 2022

(87) PCT Pub. No.: WO2021/167288
PCT Pub. Date: Aug. 26, 2021

(65) Prior Publication Data
US 2022/0381242 A1    Dec. 1, 2022

(30) Foreign Application Priority Data

Feb. 19, 2020 (KR) .......................... 10-2020-0020192

(51) Int. Cl.
*F04C 18/02* (2006.01)
*F04C 27/00* (2006.01)
(Continued)

(52) U.S. Cl.
CPC ...... *F04C 18/0215* (2013.01); *F04C 18/0292* (2013.01); *F04C 27/008* (2013.01);
(Continued)

(58) Field of Classification Search
CPC .............. F04C 18/0215; F04C 2240/30; F04C 29/042; F04C 18/0292; F04C 29/124; F04C 27/005; F04C 27/008; F04C 23/008
See application file for complete search history.

(56) References Cited

U.S. PATENT DOCUMENTS 2,064,754 A * 12/1936 Ivens ................... F04B 39/1073
137/454.4
3,998,243 A * 12/1976 Osterkorn ............. F04C 29/128
137/856
(Continued)

FOREIGN PATENT DOCUMENTS

EP    3382205 A1    10/2018
EP    3502478 A1 *  6/2019  .............. F04C 18/02
(Continued)

OTHER PUBLICATIONS

KR-20060034547-A, English Language Machine Translation (Year: 2006).*
(Continued)

*Primary Examiner* — Wesley G Harris
(74) *Attorney, Agent, or Firm* — Shumaker, Loop & Kendrick, LLP

(57) ABSTRACT

A scroll compressor including a housing, a motor provided in the housing, a rotary shaft configured to be rotated by the motor, an orbiting scroll configured to orbit in conjunction with the rotary shaft, a fixed scroll configured to define a compression chamber together with the orbiting scroll, and a discharge valve disposed on one surface of the fixed scroll and configured to open or close one or more discharge (Continued)

openings of the fixed scroll through which a refrigerant compressed in the compression chamber is discharged, in which the discharge valve includes: a discharge reed plate disposed on one surface of the fixed scroll, and a gasket retainer disposed between one surface of the fixed scroll and the housing and configured to surround the discharge reed plate.

15 Claims, 14 Drawing Sheets

(51) Int. Cl.
  *F04C 29/12* (2006.01)
  *F04C 23/00* (2006.01)
(52) U.S. Cl.
  CPC .......... *F04C 29/124* (2013.01); *F04C 29/128* (2013.01); *F04C 23/008* (2013.01); *F04C 2210/26* (2013.01)

(56) References Cited

U.S. PATENT DOCUMENTS

| | | | | |
|---|---|---|---|---|
| 4,257,458 A * | 3/1981 | Kondo | ................ | F16K 15/1402 |
| | | | | 137/856 |
| 4,955,797 A * | 9/1990 | Cowen | ................ | F04C 29/128 |
| | | | | 137/856 |
| 5,885,064 A * | 3/1999 | McCoy | ............... | F04B 39/1086 |
| | | | | 417/571 |
| 6,174,147 B1 * | 1/2001 | Tarutani | .............. | F04B 39/1073 |
| | | | | 137/856 |
| 6,632,074 B2 * | 10/2003 | Murakami | ............ | F04B 25/005 |
| | | | | 417/269 |
| 2002/0018722 A1 * | 2/2002 | Kubo | .................. | F04B 27/1804 |
| | | | | 417/222.2 |
| 2002/0197169 A1 * | 12/2002 | Ahn | ..................... | F04B 27/1036 |
| | | | | 417/540 |
| 2006/0177331 A1 * | 8/2006 | Bergman | ............ | F04B 39/1066 |
| | | | | 417/569 |
| 2015/0192127 A1 * | 7/2015 | Nagano | ................... | F04C 28/24 |
| | | | | 417/410.5 |
| 2017/0030471 A1 * | 2/2017 | Rosa | ..................... | F16K 15/144 |

FOREIGN PATENT DOCUMENTS

| | | | | | |
|---|---|---|---|---|---|
| JP | 05231304 A | * | 9/1993 | ............. | F04B 21/02 |
| JP | H11141474 A | | 5/1999 | | |
| JP | 2012180838 A | * | 9/2012 | ............. | F04C 18/02 |
| JP | 2015129467 A | | 7/2015 | | |
| JP | 2015129476 A | * | 7/2015 | ............. | F04C 18/02 |
| JP | 2015129477 A | | 7/2015 | | |
| JP | 2018053827 A | | 4/2018 | | |
| JP | 2020008009 A | | 1/2020 | | |
| KR | 20060034547 A | | 4/2006 | | |
| KR | 20060034547 A | * | 4/2006 | ............. | F04C 18/02 |
| KR | 20130011329 A | * | 1/2013 | ............. | F04B 39/10 |
| KR | 1020150083036 A | | 7/2015 | | |
| KR | 20180035699 A | | 4/2018 | | |
| KR | 101952373 B1 | | 2/2019 | | |
| KR | 20200013344 A | | 2/2020 | | |
| WO | WO-2009096206 A1 | * | 8/2009 | .......... | F04C 18/0215 |

OTHER PUBLICATIONS

WO-2009096206-A1, English Language Machine Translation (Year: 2009).*

* cited by examiner

SCROLL COMPRESSOR

CROSS-REFERENCE TO RELATED PATENT APPLICATIONS

This patent application is a United States national phase patent application based on PCT/KR2021/001769 filed on Feb. 10, 2021, which claims the benefit of Korean Patent Application No. 10-2020-0020192, filed on Feb. 19, 2020, the entire disclosures of which are hereby incorporated herein by reference.

TECHNICAL FIELD

The present disclosure relates to a scroll compressor, and more particularly, to a scroll compressor capable of compressing a refrigerant by using a fixed scroll and an orbiting scroll.

BACKGROUND ART

In general, an air conditioning (A/C) device is installed in a vehicle to cool or heat the interior of the vehicle. The air conditioning device includes a compressor which is a component of a cooling system, and the compressor compresses a low-temperature and low-pressure gaseous refrigerant introduced from an evaporator to make a high-temperature and high-pressure gaseous refrigerant and delivers the refrigerant to a condenser.

The compressors are classified into a reciprocating compressor which compresses a refrigerant using a reciprocating motion of a piston, and a rotary compressor which compresses a refrigerant using a rotational motion. Depending on methods of transmitting driving power, the reciprocating compressors are classified into a crank compressor which transmits power to a plurality of pistons using a crank, and a swash plate compressor which transmits power to a shaft on which a swash plate is installed. The rotary compressors are classified into a vane rotary compressor which uses a rotating rotary shape and vanes, and a scroll compressor which uses an orbiting scroll and a fixed scroll.

The scroll compressor has an advantage in that the scroll compressor may obtain a relatively higher compression ratio than other compressors, smoothly perform processes of introducing, compressing, and discharging the refrigerant, and thus obtain stable torque. Therefore, the scroll compressor is widely used to compress the refrigerant in an air conditioning device or the like.

FIG. 1 is a cross-sectional view illustrating a scroll compressor in the related art.

Referring to the accompanying FIG. 1, a scroll compressor in the related art includes a housing 100, a motor 200 provided in the housing 100, a rotary shaft 300 configured to be rotated by the motor 200, an orbiting scroll 400 configured to orbit in conjunction with the rotary shaft 300, and a fixed scroll 500 configured to define a compression chamber C together with the orbiting scroll 400.

According to the scroll compressor in the related art configured as described above, when power is applied to the motor 200, the rotary shaft 300 rotates together with a rotor of the motor 200, the orbiting scroll 400 orbits in conjunction with the rotary shaft 300, and a refrigerant is introduced into and compressed in the compression chamber C by the orbiting motion of the orbiting scroll 400 and then discharged from the compression chamber C. The series of processes are repeated.

However, the scroll compressor in the related art has a problem in that a discharge amount of the refrigerant to be discharged from the compression chamber C is determined, which causes a limitation in improving the performance and efficiency of the compressor.

SUMMARY

An object of the present disclosure is to provide a scroll compressor capable of improving performance and efficiency of the compressor by increasing the amount of refrigerant to be discharged from a compression chamber.

Technical problems to be solved by the present disclosure are not limited to the above-mentioned technical problems, and other technical problems, which are not mentioned above, may be clearly understood from the following descriptions by those skilled in the art to which the present disclosure pertains.

To achieve the above-mentioned object, an embodiment of the present disclosure provides a scroll compressor including: a housing; a motor provided in the housing; a rotary shaft configured to be rotated by the motor; an orbiting scroll configured to orbit in conjunction with the rotary shaft; a fixed scroll configured to define a compression chamber together with the orbiting scroll; and a discharge valve disposed on one surface of the fixed scroll and configured to open or close one or more discharge openings of the fixed scroll through which a refrigerant compressed in the compression chamber is discharged, in which the discharge valve includes: a discharge reed plate disposed on one surface of the fixed scroll; and a gasket retainer disposed between one surface of the fixed scroll and the housing and configured to surround the discharge reed plate.

According to the embodiment of the present disclosure, the discharge reed plate may have one or more reed parts configured to open or close the one or more discharge openings, respectively.

According to the embodiment of the present disclosure, the reed part may include: a head portion disposed to correspond to a position of the discharge opening and configured to open or close the discharge opening; and a leg portion extending in one direction from the head portion.

According to the embodiment of the present disclosure, the head portion and the leg portion may be formed by forming a cut-out portion in the discharge reed plate.

According to the embodiment of the present disclosure, the gasket retainer may have one or more retainer parts processed to be inclined and disposed at positions corresponding to the one or more reed parts, respectively.

According to the embodiment of the present disclosure, an inclination of the retainer part may restrict a position at which the reed part is opened maximally.

According to the embodiment of the present disclosure, the housing may include: a center housing penetrated by the rotary shaft; a front housing configured to define a motor accommodation space together with the center housing, the motor accommodation space being configured to accommodate the motor; and a rear housing configured to define a scroll accommodation space S2 together with the center housing, the scroll accommodation space S2 being configured to accommodate the orbiting scroll and the fixed scroll, and an injection valve assembly may be provided between the discharge valve and the rear housing and configured to open or close an injection flow path configured to guide a middle-pressure refrigerant to the compression chamber from the outside of the housing.

According to the embodiment of the present disclosure, the fixed scroll may include one or more injection ports configured to guide the refrigerant to the compression chamber from one surface of the fixed scroll, and the discharge reed plate may have one or more communication ports penetratively formed to correspond to the one or more injection ports.

According to the embodiment of the present disclosure, an inner diameter of the communication port may be larger than an inner diameter of the injection port or equal to the inner diameter of the injection port.

According to the embodiment of the present disclosure, the gasket retainer may have one or more insertion ports penetratively formed to correspond to the one or more injection ports.

According to the embodiment of the present disclosure, the rear housing may include: a first annular wall fastened to the center housing and configured to define a scroll accommodation space configured to accommodate the orbiting scroll and the fixed scroll; a second annular wall accommodated in the first annular wall and configured to define a discharge chamber configured to accommodate the refrigerant discharged from the compression chamber; and a third annular wall accommodated in the second annular wall and covered by the injection valve assembly, and an outer peripheral portion of the gasket retainer may be fixed by being pressed between the fixed scroll and the second annular wall.

According to the embodiment of the present disclosure, an inner side of the gasket retainer may be fixed by being pressed toward the fixed scroll by the injection valve assembly.

According to the embodiment of the present disclosure, the injection valve assembly may include: a cover plate configured to cover the third annular wall and having an inflow port into which the middle-pressure refrigerant is introduced; a valve plate coupled to one surface of the cover plate, which is adjacent to the discharge valve, and having an outflow port through which the refrigerant introduced into the inflow port is discharged toward the discharge valve; and an injection valve interposed between the cover plate and the valve plate and configured to allow the inflow port and the outflow port to selectively communicate with each other.

According to the embodiment of the present disclosure, the valve plate may include a protruding portion protruding from one surface of the valve plate, which is adjacent to the discharge valve, toward the discharge valve and having the outflow port extending therein, and at least a part of the protruding portion may be inserted into the insertion port.

According to the embodiment of the present disclosure, the protruding portion may include: a large diameter portion protruding from one surface of the valve plate, which is adjacent to the discharge valve, toward the discharge valve; and a small diameter portion protruding from the large diameter portion toward the discharge valve and having an outer diameter smaller than an outer diameter of the large diameter portion, and the small diameter portion may be inserted into the insertion port.

According to the embodiment of the present disclosure, an axial length of the small diameter portion may be shorter than an axial length of the insertion port or equal to the axial length of the insertion port.

According to the embodiment of the present disclosure, the communication port may communicate with the outflow port and the injection port.

According to the present disclosure, not only the suction-pressure refrigerant but also the middle-pressure refrigerant are introduced into the compression chamber C of the scroll compressor, such that the amount of refrigerant to be discharged from the compression chamber may increase, which makes it possible to improve performance and efficiency of the compressor.

In addition, since the reed part of the discharge valve may be formed in any direction on the discharge reed plate, a degree of freedom related to position design of the reed part is high, and it is easy to prevent the reed part from interfering with the communication port.

The effects of the present disclosure are not limited to the above-mentioned effects, and it should be understood that the effects of the present disclosure include all effects that may be derived from the detailed description of the present disclosure or the appended claims.

DETAILED DESCRIPTION OF AN EMBODIMENT

Figure 1:
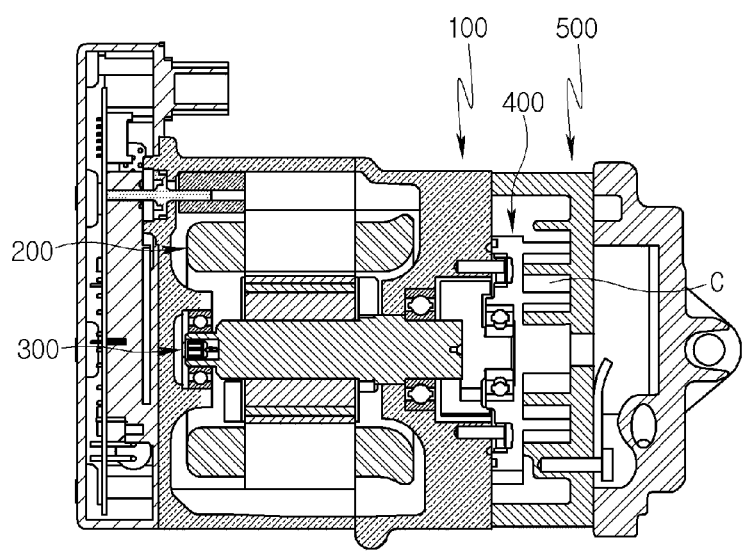
FIG. 1 is a cross-sectional view illustrating a scroll compressor in the related art.

Hereinafter, exemplary embodiments of a scroll compressor according to the present disclosure will be described with reference to the accompanying drawings.

In addition, the terms used below are defined considering the functions in the present disclosure and may vary depending on the intention of a user or an operator or a usual practice. The following embodiments are not intended to limit the protection scope of the present disclosure but just exemplary constituent elements disclosed claims in the present disclosure.

A part irrelevant to the description will be omitted to clearly describe the present disclosure, and the same or similar constituent elements will be designated by the same reference numerals throughout the specification. Throughout the specification, unless explicitly described to the contrary, the word "comprise/include" and variations such as "comprises/includes" or "comprising/including" will be understood to imply the inclusion of stated elements, not the exclusion of any other elements.

First, a scroll compressor according to an embodiment of the present disclosure will be described with reference to FIGS. 2 to 12.

Figure 2:
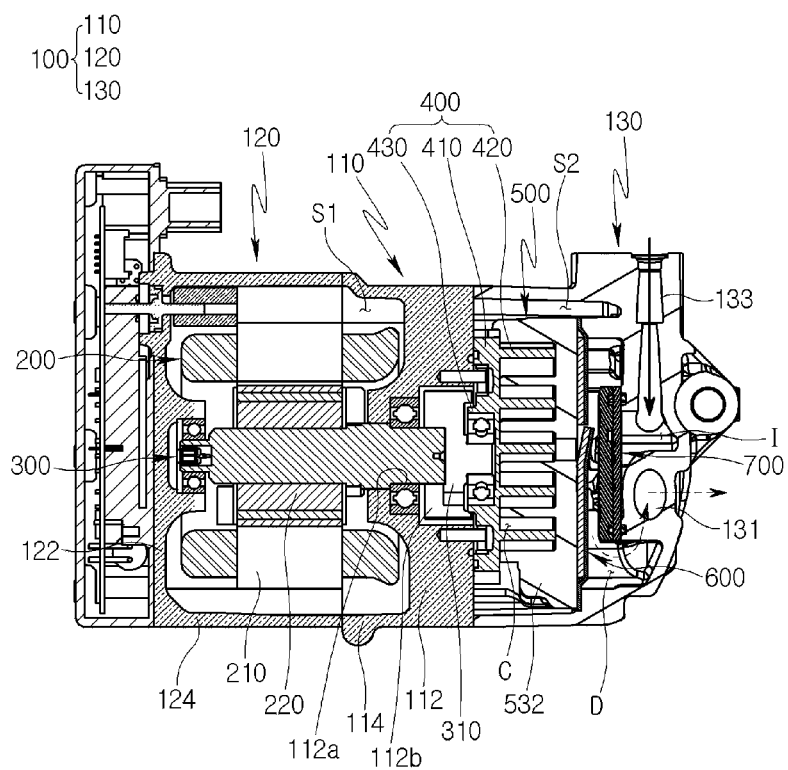
FIG. 2 is a cross-sectional view illustrating a scroll compressor according to an embodiment of the present disclosure.

As illustrated in FIG. 2, the scroll compressor according to the embodiment of the present disclosure may include a housing 100, a motor 200 provided in the housing 100, a rotary shaft 300 configured to be rotated by the motor 200, an orbiting scroll 400 configured to orbit in conjunction with the rotary shaft 300, a fixed scroll 500 configured to define compression chambers C together with the orbiting scroll 400, and a discharge valve 600 disposed on one surface of the fixed scroll 500 and configured to open or close discharge openings 512 of the fixed scroll from which a refrigerant compressed in the compression chamber C is discharged.

Further, the compressor according to the present embodiment may further include an injection valve assembly 700 that defines and opens or closes an injection flow path configured to guide a middle-pressure refrigerant to the compression chamber C from the outside of the housing 100 (e.g., from a downstream side of a condenser in a vapor compression refrigeration cycle including a scroll compressor, the condenser, an expansion valve, and an evaporator.

In this case, the injection flow path includes an introduction port 133, an introduction chamber I, an inflow port 712, an inclined space 734, connection flow paths 738, outflow ports 736, communication ports 612, and injection ports 514, which will be described below. The injection flow path extends from a rear housing 130 to the fixed scroll 500. The injection valve assembly 700 includes the inflow port 712, the inclined space 734, the connection flow paths 738, and the outflow ports 736 and may be interposed between the rear housing 130 and the fixed scroll 500, particularly, between the rear housing 130 and the discharge valve 600.

Specifically, the housing 100 may include a center housing 110 penetrated by the rotary shaft 300, a front housing 120 configured to define, together with the center housing 110, a motor accommodation space S1 that accommodates the motor 200, and the rear housing 130 configured to define, together with the center housing 110, a scroll accommodation space S2 that accommodates the orbiting scroll 400 and the fixed scroll 500.

The center housing 110 may include a center end plate 112 configured to separate the motor accommodation space S1 and the scroll accommodation space S2 and support the orbiting scroll 400 and the fixed scroll 500, and a center side plate 114 protruding from an outer peripheral portion of the center end plate 112 toward the front housing 120.

The center end plate 112 has an approximately circular plate shape. A bearing hole 112a penetrated by one end of the rotary shaft 300 may be formed in a central portion of the center end plate 112. A back pressure chamber 112b configured to press the orbiting scroll 400 toward the fixed scroll 500 may be formed in the central portion of the center end plate 112. In this case, an eccentric bushing 310 is provided at one end of the rotary shaft 300 and converts a rotational motion of the rotary shaft 300 into an orbiting motion of the orbiting scroll 400. The back pressure chamber 112b sometimes provides a space in which the eccentric bushing 310 may rotate. Further, as described below, a suction flow path (not illustrated) may be formed on an outer peripheral portion of the center end plate 112 and guide the refrigerant, which is introduced into the motor accommodation space S1, to the scroll accommodation space S2.

The front housing 120 may include a front end plate 122 configured to face the center end plate 112 and support the other end of the rotary shaft 300, and a front side plate 124 protruding from an outer peripheral portion of the front end plate 122, fastened to the center side plate 114, and configured to support the motor 200. In this case, the center end plate 112, the center side plate 114, the front end plate 122, and the front side plate 124 may define the motor accommodation space S1. Further, a suction port (not illustrated) may be formed in the front side plate 124 and guide the refrigerant with a suction pressure to the motor accommodation space S1 from the outside.

As illustrated in FIGS. 3 to 6, the rear housing 130 may include a rear end plate 132 configured to face the center end plate 112, a first annular wall 134 protruding from the rear end plate 132 and positioned at an outermost peripheral side of the rear housing 130 based on a circumferential direction of the rear housing 130, a second annular wall 136 protruding from the rear end plate 132 and accommodated in the first annular wall 134, and a third annular wall 138 protruding from the rear end plate 132 and accommodated in the second annular wall 136. The first annular wall 134, the second annular wall 136, and the third annular wall 138 may have different heights.

The first annular wall 134 may have an annular shape having a diameter approximately equal in level to a diameter of the outer peripheral portion of the center end plate 112. The first annular wall 134 may be fastened to the outer peripheral portion of the center end plate 112 and define the scroll accommodation space S2.

The second annular wall 136 has an annular shape having a diameter smaller than a diameter of the first annular wall 134. The second annular wall 136 may come into contact with an outer peripheral portion of a fixed end plate 510 of the fixed scroll 500 to be described below. The second annular wall 136 may define a discharge chamber D that accommodates the refrigerant discharged from the compression chamber C. In this case, the second annular wall 136 is formed to come into contact with the fixed end plate 510, particularly, formed to come into contact with the fixed end plate 510 with a gasket retainer 630 of the discharge valve 600, which will be described below, interposed therebetween. Therefore, the rear housing 130 presses the fixed scroll 500 toward the center housing 110 when the rear housing 130 is fastened to the center housing 110, thereby improving a fastening force between the fixed scroll 500 and the center housing 110 and preventing a leak between the fixed scroll 500 and the center housing 110.

The third annular wall 138 has an annular shape having a diameter smaller than a diameter of the second annular wall 136 and is spaced apart from the fixed end plate 510. The third annular wall 138 may be covered by a cover plate 710 of the injection valve assembly 700 to be described below, thereby defining the introduction chamber I that accommodates the refrigerant introduced through the introduction port 133.

A discharge port 131 is formed in the rear end plate 132 and guides the refrigerant in the discharge chamber D to the outside of the housing 100. The discharge port 131 may extend in a radial direction of the rear end plate 132 from a central portion of the rear end plate 132 to one side of an outer peripheral portion of the rear end plate 132. Further, a discharge port inlet 131a may be formed in the rear end plate 132 and guide the refrigerant in the discharge chamber D to the discharge port 131.

Meanwhile, a tubular oil separator (not illustrated) may be provided in the discharge port 131 and separate oil from the refrigerant. The oil separator may separate the oil from the refrigerant in a process in which the refrigerant introduced into the discharge port inlet 131a flows toward a center of the rear end plate 132 along a space between an outer peripheral surface of the oil separator and an inner peripheral surface of the discharge port 131, changes in direction, and then is discharged to one side of the outer peripheral portion of the rear end plate 132 along an inner peripheral portion of the oil separator.

In addition, the introduction port 133 is also formed in the rear end plate 132, and the middle-pressure refrigerant is introduced into the introduction port 133 from the outside of the housing 100. The introduction port 133 may extend in the radial direction of the rear end plate 132 from the other side of the outer peripheral portion of the rear end plate 132 to the central portion of the rear end plate 132 and communicate with the introduction chamber I.

As described above, the rear housing 130 may have the discharge chamber D, the discharge port 131, the introduction port 133, and the introduction chamber I. At least a part of the introduction chamber I may be accommodated in the discharge chamber D, at least a part of the discharge port 131 may be accommodated in the introduction chamber I, and at least a part of the introduction port 133 may be accommodated in the discharge chamber D.

Specifically, at least a part of the introduction chamber I may be accommodated in the discharge chamber D when the third annular wall 138 is accommodated in the second annular wall 136 and the third annular wall 138 is spaced apart from the fixed end plate 510 and covered by the injection valve assembly 700. That is, a lateral portion of the introduction chamber I may overlap the discharge chamber D in the radial direction of the rear housing 130 with the third annular wall 138 interposed therebetween. A tip portion of the introduction chamber I may overlap the discharge chamber D in an axial direction of the rear housing 130 with the injection valve assembly 700 interposed therebetween.

In addition, since the discharge port 131 extends in the radial direction of the rear end plate 132 from the central portion of the rear end plate 132 to one side of the outer peripheral portion of the rear end plate 132, at least a part of the discharge port 131 may be accommodated in the introduction chamber I. That is, at least a part of the discharge port 131 may overlap the introduction chamber I in the axial direction of the rear housing 130 with a wall portion of the discharge port 131 interposed therebetween.

In addition, since the introduction port 133 extends in the radial direction of the rear end plate 132 from the other side of the outer peripheral portion of the rear end plate 132 to the central portion of the rear end plate 132, at least a part of the introduction port 133 may be accommodated in the discharge chamber D. That is, at least a part of the introduction port 133 may overlap the discharge chamber D in the axial direction of the rear housing 130 with a wall portion of the introduction port 133.

Meanwhile, the discharge port 131 and the introduction port 133 may be formed such that the refrigerant in the discharge port 131 and the refrigerant in the introduction port 133 flow in a cross-flow direction. That is, an angle between an outlet of the discharge port 131 and an inlet of the introduction port 133 may be equal to or larger than 0° and smaller than 90° with respect to a center of the rear housing 130.

Further, the third annular wall 138 may have fastening grooves 138a and first positioning grooves 138b. Fastening bolts 770 for fastening the injection valve assembly 700 to the third annular wall 138 may be inserted into the fastening grooves 138a. Positioning pins 780 for aligning the cover plate 710, an injection valve 720, and a valve plate 730 of the injection valve assembly 700 with predetermined positions may be inserted into the first positioning grooves 138b.

As illustrated in FIG. 2, the motor 200 may include a stator 210 fixed to the front side plate 124, and a rotor 220 configured to be rotated in the stator 210 by an interaction with the stator 210.

The rotary shaft 300 is fastened to the rotor 220 and penetrates a central portion of the rotor 220, such that one end of the rotary shaft 300 may penetrate the bearing hole 112a of the center end plate 112, and the other end of the rotary shaft 300 may be supported on the front end plate 122.

The orbiting scroll 400 may be interposed between the center end plate 112 and the fixed scroll 500 and include an orbiting end plate 410 having a circular plate shape, an orbiting wrap 420 protruding from a central portion of the orbiting end plate 410 toward the fixed scroll 500, and a boss part 430 protruding from the central portion of the orbiting end plate 410 in a direction opposite to the orbiting wrap 420 and fastened to the eccentric bushing 310.

Figure 3:
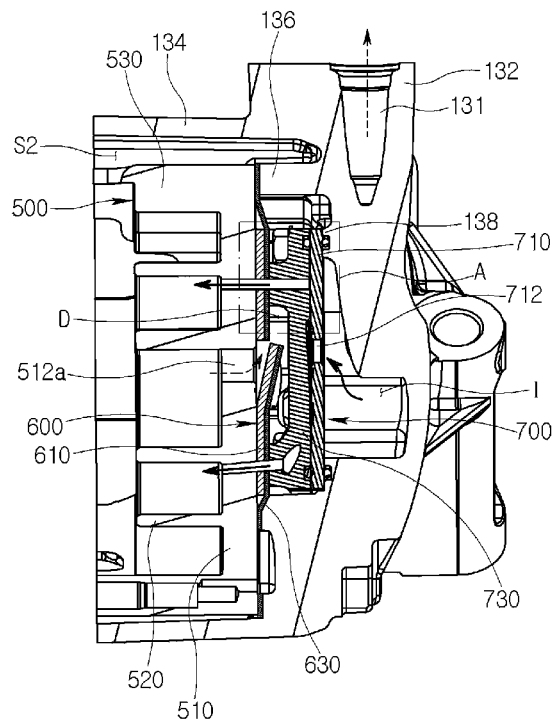
FIG. 3 is a cross-sectional view illustrating a rear housing of the scroll compressor illustrated in FIG. 2 when viewed in another direction.
Figure 4:
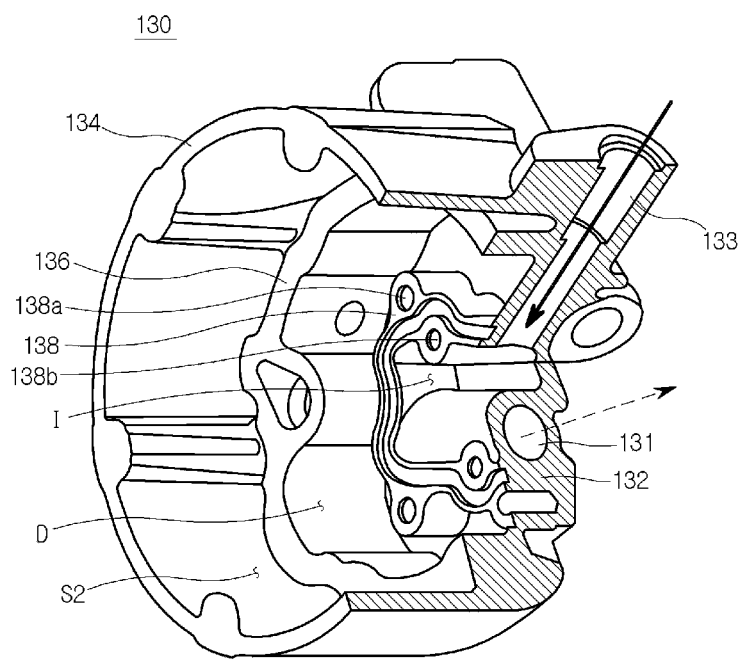
FIG. 4 is a partially cross-sectional perspective view illustrating a state in which the rear housing is separated from the scroll compressor illustrated in FIG. 2.
Figure 5:
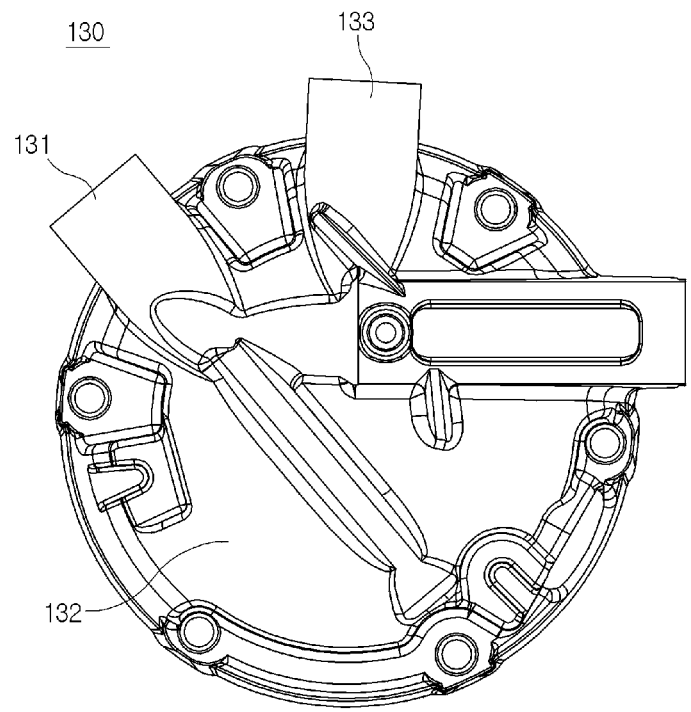
FIG. 5 is a front view illustrating a state in which the rear housing is separated from the scroll compressor illustrated in FIG. 2.
Figure 6:
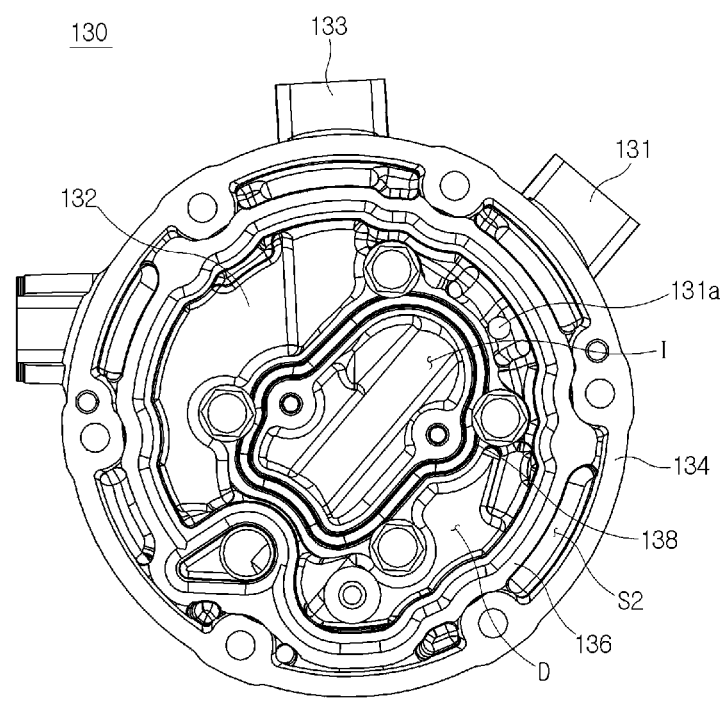
FIG. 6 is a rear view of FIG. 5.
Figure 7:
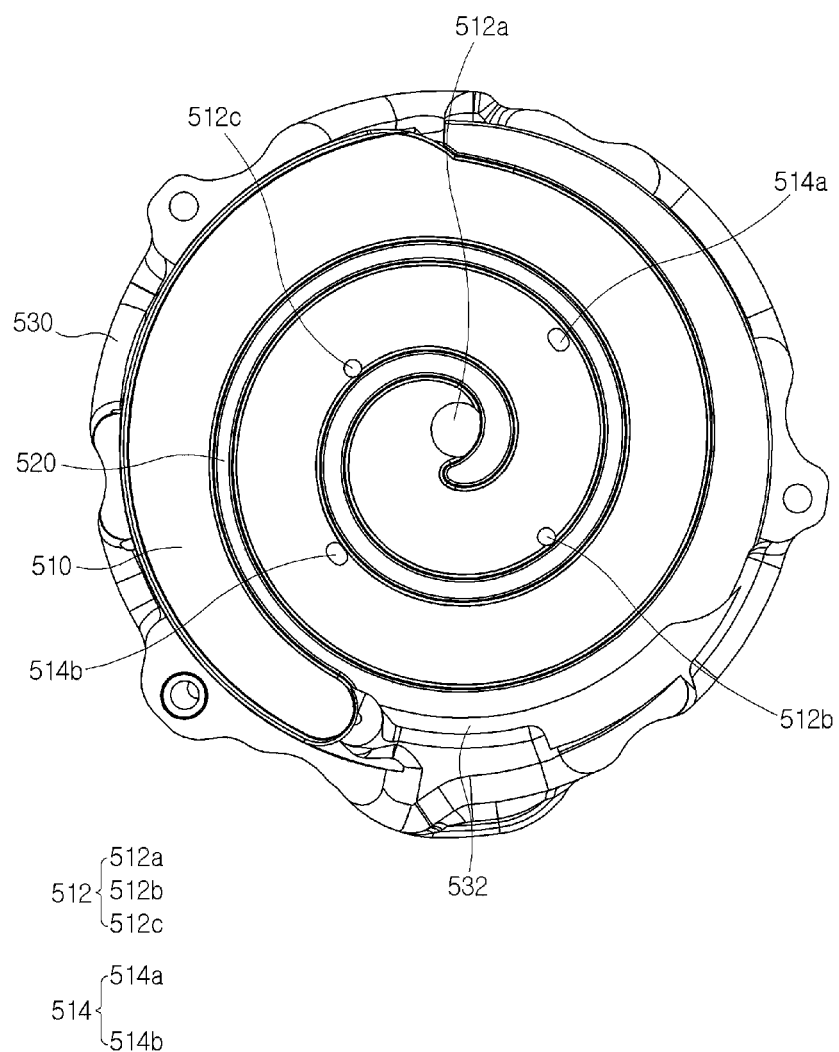
FIG. 7 is a rear view of a fixed scroll of the scroll compressor illustrated in FIG. 2.
Figure 8:
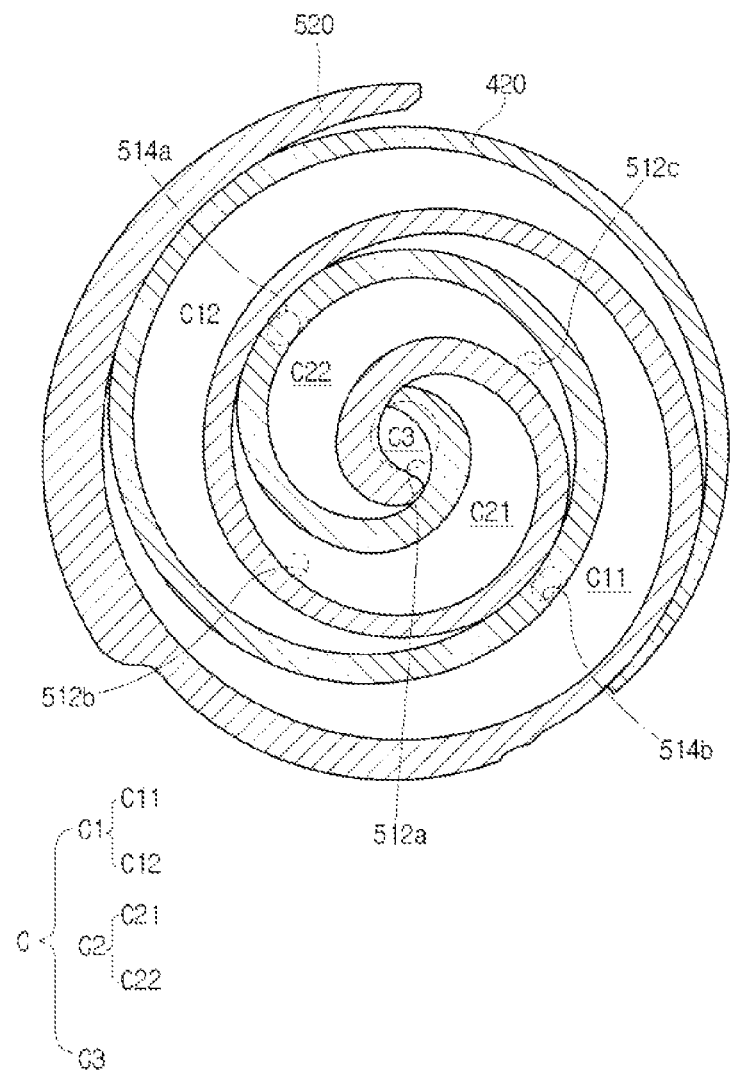
FIGS. 8 to 11 are cross-sectional views illustrating a fixed wrap, an orbiting wrap, and injection ports when a rotation angle of a rotary shaft is first, second, third, and fourth angles.
Figure 9:
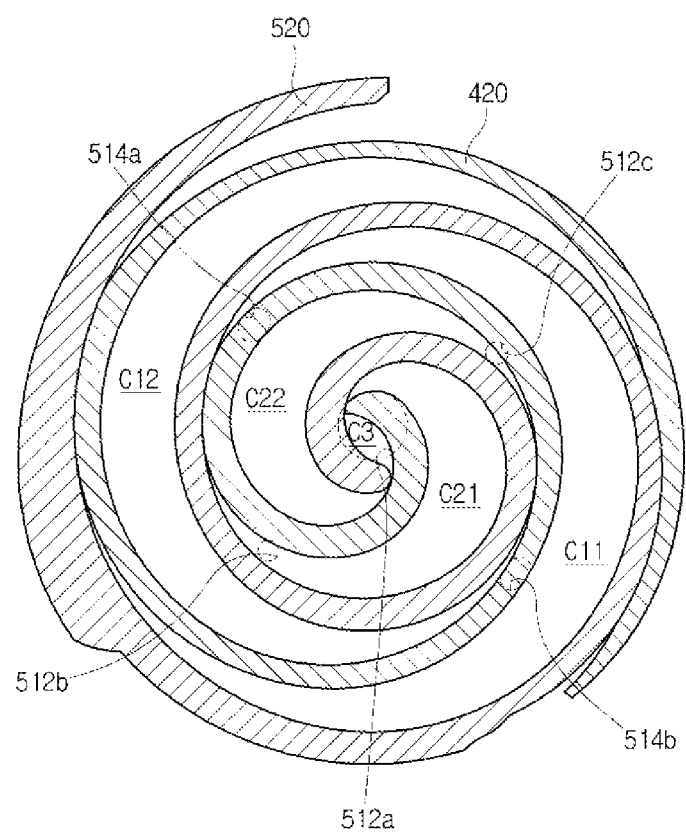
Figure 10:
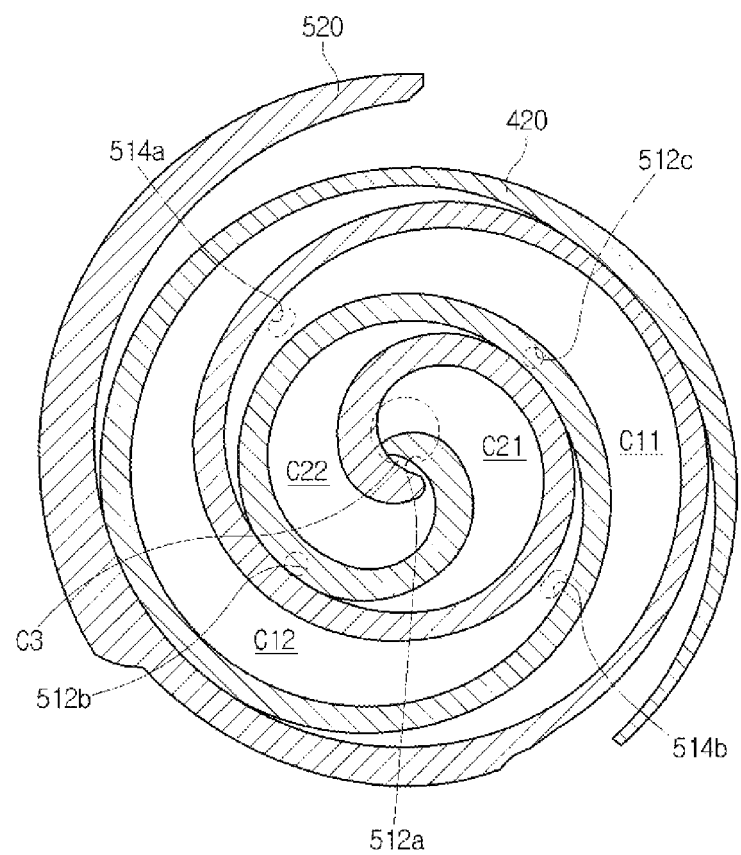
Figure 11:
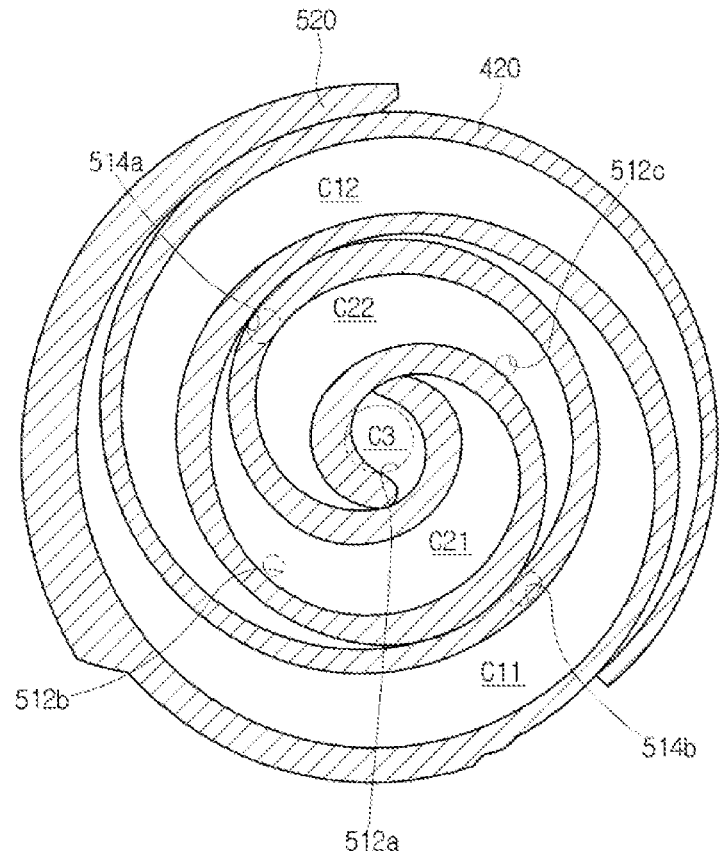

As illustrated in FIGS. 3 and 7, the fixed scroll 500 may include the fixed end plate 510 having a circular plate shape, a fixed wrap 520 protruding from a central portion of the fixed end plate 510 and configured to engage with the orbiting wrap 420, and a fixed side plate 530 protruding from an outer peripheral portion of the fixed end plate 510 and fastened to the center end plate 112.

The fixed end plate 510 may include the discharge openings 512 from which the refrigerant in the compression chamber C is discharged to the discharge chamber D, and the injection ports 514 configured to guide the refrigerant, which is discharged from the injection valve assembly 700, to the compression chamber C. The discharge opening 512 may be provided in plural to prevent the refrigerant from being excessively compressed. The plurality of discharge openings 512 may be opened or closed by the discharge valve 600 interposed between the fixed end plate 510 and the injection valve assembly 700.

Specifically, as illustrated in FIGS. 8 to 11, the compression chamber C may include a first compression chamber C1 positioned at a centrifugal side in a radial direction of the scroll accommodation space S2 and having the refrigerant at a pressure in a first pressure range, a second compression chamber C2 positioned to be closer to a centripetal side in the radial direction of the scroll accommodation space S2 than the first compression chamber C1 to the centripetal side and having the refrigerant at a pressure in a second pressure range higher than the first pressure range, and a third compression chamber C3 positioned to be closer to the centripetal side in the radial direction of the scroll accommodation space S2 than the second compression chamber C2 to the centripetal side and having the refrigerant at a pressure in a third pressure range higher than the second pressure range.

The first compression chambers C1 may include a first outer compression chamber C11 defined by an outer peripheral surface of the orbiting wrap 420 and an inner peripheral surface of the fixed wrap 520, and a first inner compression chamber C12 defined by an inner peripheral surface of the orbiting wrap 420 and an outer peripheral surface of the fixed wrap 520.

The second compression chambers C2 may include a second outer compression chamber C21 defined by the outer peripheral surface of the orbiting wrap 420 and the inner peripheral surface of the fixed wrap 520, and a second inner compression chamber C22 defined by the inner peripheral surface of the orbiting wrap 420 and the outer peripheral surface of the fixed wrap 520.

The third compression chambers C3 may include a third outer compression chamber C31 defined by the outer peripheral surface of the orbiting wrap 420 and the inner peripheral surface of the fixed wrap 520, and a third inner compression chamber C32 defined by the inner peripheral surface of the orbiting wrap 420 and the outer peripheral surface of the fixed wrap 520.

In this case, the discharge openings 512 may include a main discharge opening 512a formed adjacent to a center of the fixed end plate 510 to discharge the refrigerant in the third compression chamber C3, a first sub-discharge opening 512b formed outside the main discharge opening 512a in a radial direction of the fixed end plate 510 to discharge the refrigerant in the second outer compression chamber C21, and a second sub-discharge opening 512c formed outside the main discharge opening 512a in the radial direction of the fixed end plate 510 and disposed opposite to the first sub-discharge opening 512b based on the main discharge opening 512a to discharge the refrigerant in the second inner compression chamber C22.

The injection port 514 may be provided in plural to supply the refrigerant, which is discharged from the injection valve assembly 700, to both the pair of second compression chambers C2. That is, the injection ports 514 may include a first injection port 514a that may communicate with the second outer compression chamber C21, and a second injection port 514b that may communicate with the second inner compression chamber C22. The first injection port 514a and the second injection port 514b may be formed opposite to each other based on an imaginary line that connects the first sub-discharge opening 512b and the second sub-discharge opening 512c. However, the present disclosure is not limited thereto, and the injection port 514 may be provided in plural, and the plurality of injection ports 514 may be formed at the same side based on an imaginary line that connects the first sub-discharge opening 512b and the second sub-discharge opening 512c.

Figure 12:
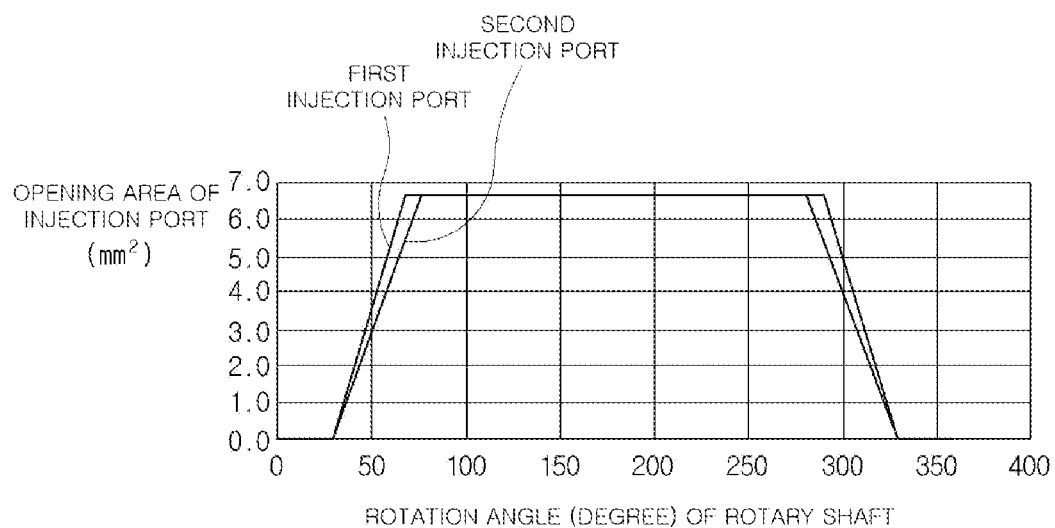
FIG. 12 is a graph illustrating a timing of opening or closing the injection ports.
Figure 13:
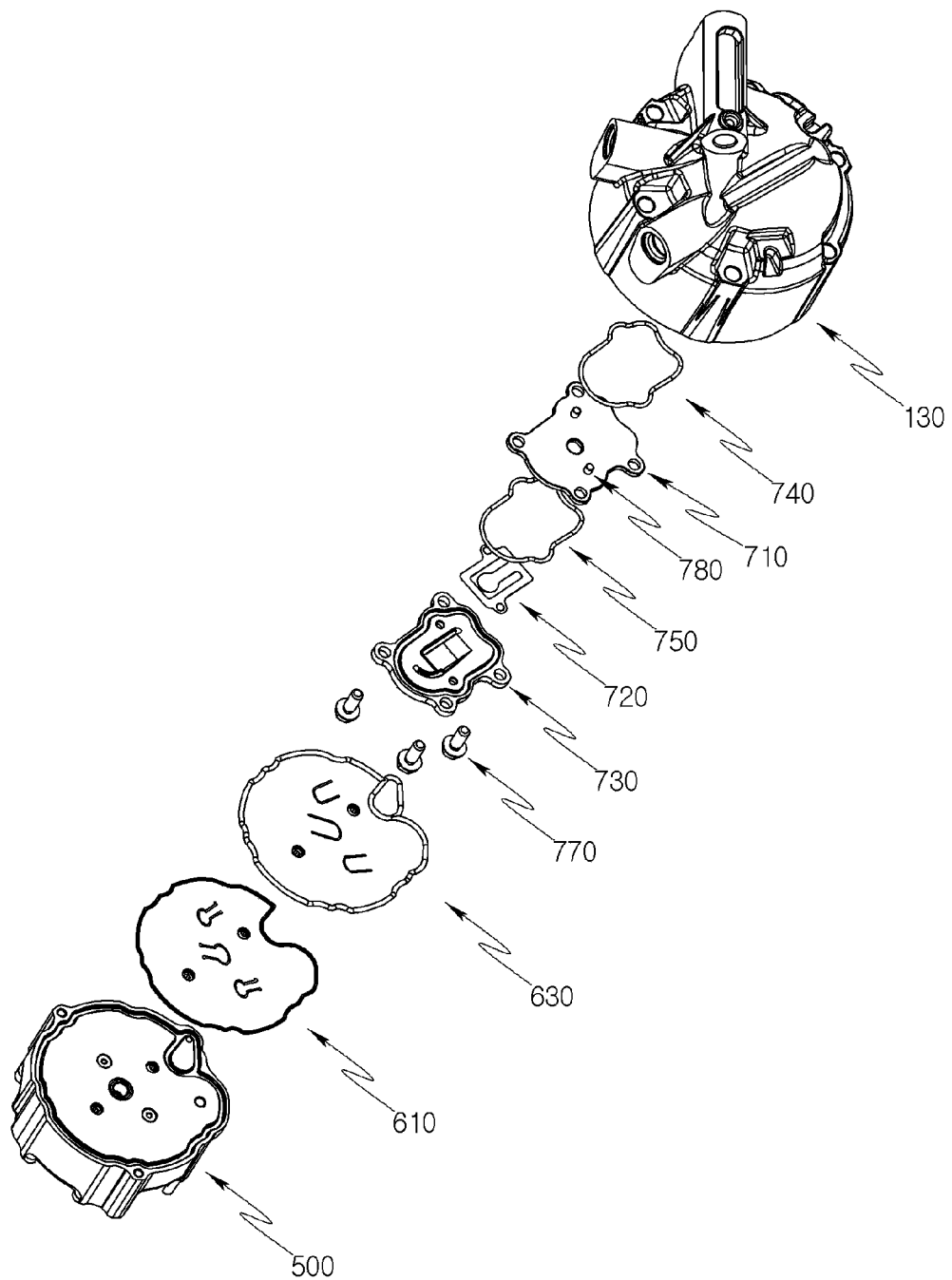
FIG. 13 is an exploded perspective view illustrating the rear housing of the scroll compressor illustrated in FIG. 2 and components accommodated in the rear housing.

In this case, the injection ports 514 may simultaneously communicate with the second outer compression chamber C21 and the second inner compression chamber C22 so that pressure imbalance does not occur between the second outer compression chamber C21 and the second inner compression chamber C22. That is, as illustrated in FIG. 12, when the communication between the first injection port 514a and the second outer compression chamber C21 is initiated, the communication between the second injection port 514b and the second inner compression chamber C22 may be initiated.

In addition, particularly, the injection ports 514 may be blocked simultaneously together with the second outer compression chamber C21 and the second inner compression chamber C22. That is, as illustrated in FIG. 12, when the communication between the first injection port 514a and the second outer compression chamber C21 is blocked, the communication between the second injection port 514b and the second inner compression chamber C22 may be blocked.

The injection port 514 may be provided in the form of a long hole in order to increase a flow rate of the refrigerant to be injected into the compression chamber C. The injection port 514 may have a constant cross-sectional shape to prevent a loss of pressure and flow rate when the refrigerant passes through the injection port 514. That is, an inner diameter of the injection port 514 may be set as a value predetermined regardless of an axial position of the injection port 514.

For example, the fixed wrap 520 may extend in a logarithmic spiral shape from a center to an outer peripheral portion of the fixed scroll 500. The fixed side plate 530 may include a fixed wrap introduction part 532 having an annular shape extending along the outer peripheral portion of the fixed end plate 510 and having one side connected to the fixed wrap 520.

An axial height of the fixed wrap introduction part 532 may be equal in level to an axial height of the fixed wrap 520 to prevent the refrigerant in the compression chamber C from leaking through the fixed wrap introduction part 532. In addition, a radial thickness of the fixed wrap introduction part 532 is larger than a radial thickness of the fixed wrap 520 to improve support rigidity of the fixed wrap 520. In this case, to reduce the weight and costs of the fixed scroll 500, the fixed side plate 530 may be formed such that a radial thickness of a portion, except for the fixed wrap introduction part 532, may be smaller than the radial thickness of the fixed wrap introduction part 532.

Next, the injection valve assembly 700 will be described below in detail with reference to FIGS. 13 to 17. The injection valve assembly 700 may be disposed on a tip surface of the third annular wall 138 so as to allow the introduction chamber I and the injection port 514 to communicate with each other or block the communication between the introduction chamber I and the injection port 514.

Specifically, the injection valve assembly 700 may include the cover plate 710 fastened to the tip surface of the third annular wall 138 and configured to cover the introduction chamber I, the valve plate 730 fastened to the cover plate 710 and disposed opposite to the introduction chamber I based on the cover plate 710, and the injection valve 720 interposed between the cover plate 710 and the valve plate 730.

Figure 14:
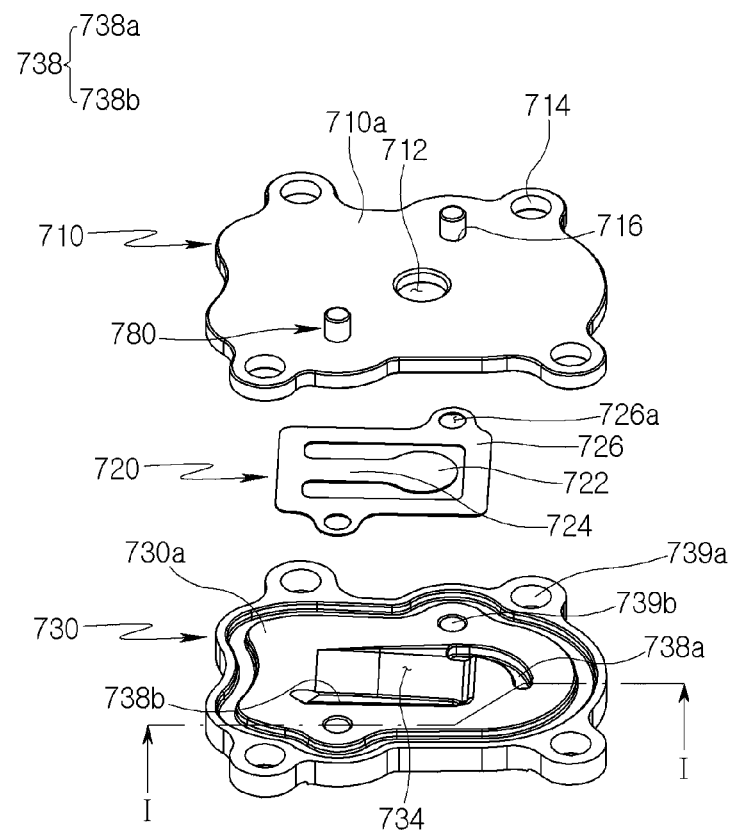
FIG. 14 is an exploded perspective view illustrating an injection valve assembly among the components illustrated in FIG. 13.
Figure 15:
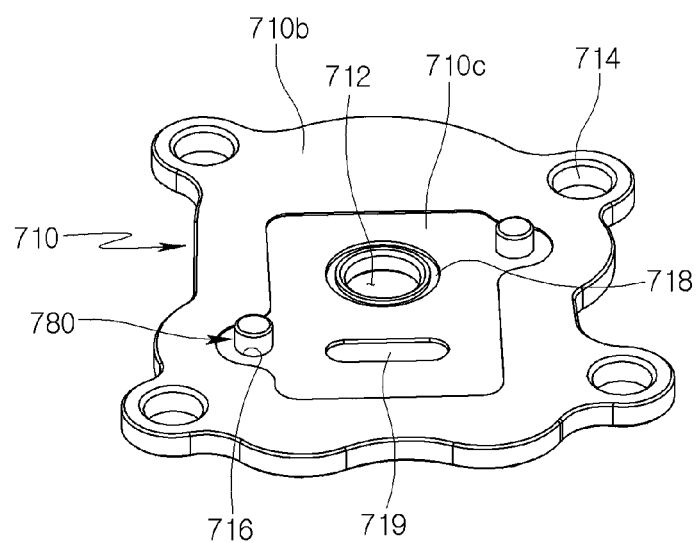
FIG. 15 is a perspective view illustrating a rear surface of a cover plate of the injection valve assembly illustrated in FIG. 14.

As illustrated in FIGS. 14 and 15, the cover plate 710 may include a cover plate upper surface 710a configured to face the third annular wall 138, a cover plate lower surface 710b configured to face the valve plate 730 and the injection valve 720, and an injection valve seating groove 710c provided in a central portion of the cover plate 710 and formed to be recessed from the cover plate lower surface 710b.

In addition, the cover plate 710 may further include the inflow port 712 configured to allow the introduction chamber I and the inclined space 734 to be described below to communicate with each other, second fastening holes 714 configured to communicate with the fastening grooves 138a and be penetrated by the fastening bolts 770, and first positioning holes 716 configured to communicate with the first positioning grooves 138b and be penetrated by the positioning pins 780.

The inflow port 712 is provided in the central portion of the cover plate 710 and penetratively formed from the cover plate upper surface 710a to the injection valve seating groove 710c. The second fastening hole 714 is provided in the outer peripheral portion of the cover plate 710 and penetratively formed from the cover plate upper surface 710a to the cover plate lower surface 710b. In addition, the first positioning hole 716 is formed between the inflow port 712 and the second fastening hole 714 in the radial direction of the cover plate 710 and penetratively formed from the cover plate upper surface 710a to the injection valve seating groove 710c or the cover plate lower surface 710b.

As illustrated in FIG. 14, the injection valve 720 may include a head portion 722 configured to open or close the inflow port 712, a leg portion 724 configured to support the head portion 722, and a peripheral portion 726 configured to support the leg portion 724. The head portion 722 may have a circular plate shape having an outer diameter larger than an inner diameter of the inflow port 712. The leg portion 724 may have a plate shape extending in one direction from the head portion 722 to one side of the peripheral portion 726. In addition, the peripheral portion 726 may have a ring shape that accommodates the head portion 722 and the leg portion 724 while being accommodated in the injection valve seating groove 710c. For example, in the present embodiment, the peripheral portion 726 may have a quadrangular ring shape. The peripheral portion 726 may include second positioning holes 726a configured to communicate with the first positioning holes 716 and be penetrated by the positioning pins 780.

In this case, the injection valve 720 is fixed, without a separate fastening member for fixing the injection valve 720, as the peripheral portion 726 is compressed between the injection valve seating groove 710c and the valve plate 730. To this end, an axial thickness of the peripheral portion 726 may be equal to or larger than an axial depth of the injection valve seating groove 710c (more accurately, a distance between a base surface of the injection valve seating groove 710c and a valve plate upper surface 730a to be described below). In this case, an axial thickness of the peripheral portion 726 may be designed to be larger than an axial depth of the injection valve seating groove 710c to prevent a case in which the peripheral portion 726 is not compressed between the injection valve seating groove 710c and the valve plate 730 because of tolerance.

Figure 16:
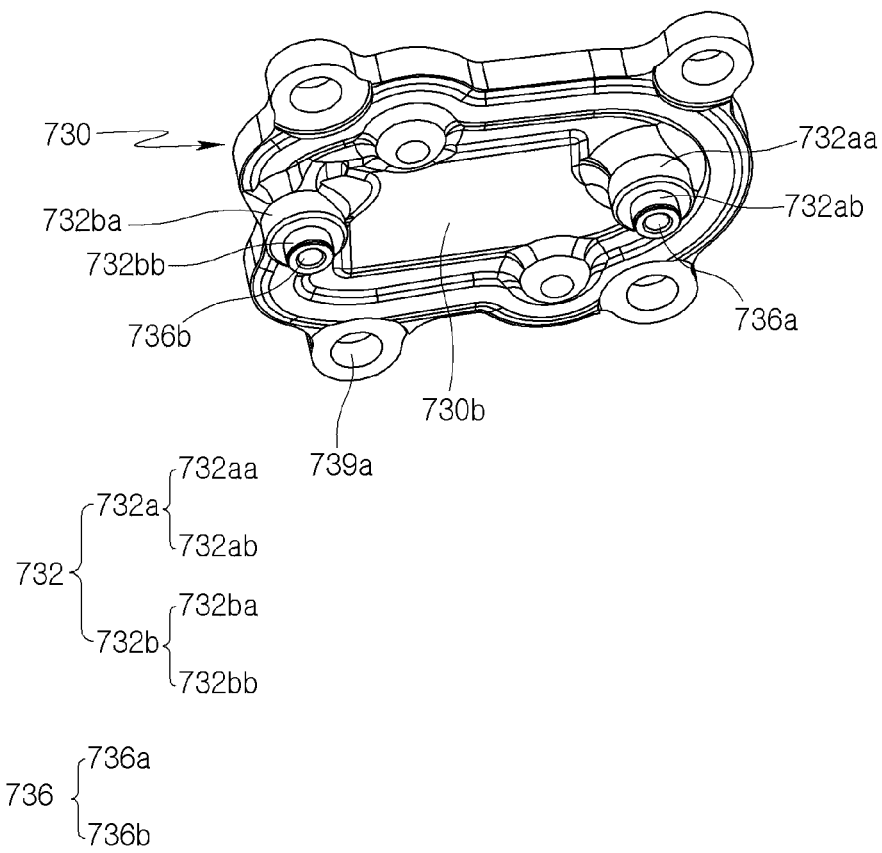
FIG. 16 is a perspective view illustrating a rear surface of a valve plate of the injection valve assembly illustrated in FIG. 14.
Figure 17:
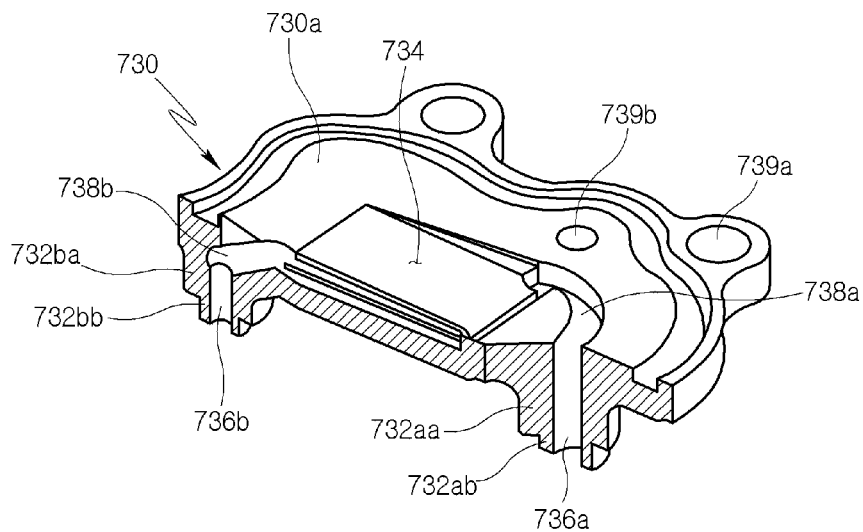
FIG. 17 is a perspective view taken along line I-I in FIG. 14.

As illustrated in FIGS. 14, 16, and 17, the valve plate 730 may include the valve plate upper surface 730a configured to face the cover plate 710 and the injection valve 720, and a valve plate lower surface 730b configured to face the fixed scroll 500 while defining a rear surface of the valve plate upper surface 730a.

In addition, the valve plate 730 may further include protruding portions 732 protruding from the valve plate lower surface 730b toward the first injection port 514a and the second injection port 514b. That is, the valve plate 730 may include a first protruding portion 732a protruding from one side of the valve plate lower surface 730b toward the first injection port 514a, and a second protruding portion 732b protruding from the other side of the valve plate lower surface 730b toward the second injection port 514b.

In this case, the first protruding portion 732a may include a first large diameter portion 732aa protruding from one side of the valve plate lower surface 730b toward the first injection port 514a, and a first small diameter portion 732ab further protruding from the first large diameter portion 732aa toward the first injection port 514a. An outer diameter of the first large diameter portion 732aa is larger than an outer diameter of the first small diameter portion 732ab.

Likewise, the second protruding portion 732b may also include a second large diameter portion 732ba protruding from the other side of the valve plate lower surface 730b toward the second injection port 514b, and a second small diameter portion 732bb further protruding from the second large diameter portion 732ba toward the second injection port 514b. An outer diameter of the second large diameter portion 732ba is larger than an outer diameter of the second small diameter portion 732bb.

In addition, the valve plate 730 may further include the inclined space 734 configured to serve as a retainer for the injection valve 720 and accommodate the refrigerant introduced through the inflow port 712, the first outflow port 736a formed in the first protruding portion 732a and configured to communicate with the first injection port 514a, the second outflow port 736b formed in the second protruding portion 732b and configured to communicate with the second injection port 514b, the first connection flow path 738a configured to guide the refrigerant in the inclined space 734 to the first outflow port 736a, and the second connection flow path 738b configured to guide the refrigerant in the inclined space 734 to the second outflow port 736b.

The valve plate upper surface 730a may be formed as a flat surface that is in contact with the peripheral portion 726 of the injection valve 720 and the cover plate lower surface 710b. The inclined space 734 may be recessed from the valve plate upper surface 730a. The inclined space 734 may include a retainer surface that supports the head portion 722 and the leg portion 724 of the injection valve 720 when the injection valve 720 opens the inflow port 712, i.e., when the inflow port 712 is opened as the head portion 722 and the leg portion 724 of the injection valve 720 moves toward the valve plate 730 relative to the peripheral portion 726.

The first outflow port 736a is recessed from a tip surface of the first protruding portion 732a, more accurately, a tip surface of the first small diameter portion 732ab. The first outflow port 736a may extend to the first large diameter portion 732aa. The second outflow port 736b is recessed from a tip surface of the second protruding portion 732b, more accurately, a tip surface of the second small diameter portion 732bb. The second outflow port 736b may extend to the second large diameter portion 732ba.

The first connection flow path 738a may be recessed from the valve plate upper surface 730a and allow one side of the inclined space 734 to communicate with the first outflow port 736a. In addition, the second connection flow path 738b may be recessed from the valve plate upper surface 730a and allow the other side of the inclined space 734 to communicate with the second outflow port 736b.

The valve plate lower surface 730b is spaced apart from the fixed end plate 510 so that the discharge valve 600 is interposed between the fixed end plate 510 and the valve plate lower surface 730b and the refrigerant discharged from the discharge opening 512 flows into the discharge chamber D.

The valve plate 730 may further include first fastening holes 739a, which are provided in an outer peripheral portion of the valve plate 730 and penetratively formed from the valve plate upper surface 730a to the valve plate lower surface 730b, so that the first fastening holes 739a communicate with the second fastening holes 714 and are penetrated by the fastening bolts 770. In addition, the valve plate 730 may further include second positioning grooves 739b recessed from the valve plate upper surface 730a so that the second positioning grooves 739b communicate with the second positioning holes 726a and the positioning pins 780 are inserted into the second positioning grooves 739b.

Therefore, one end of the positioning pin 780 penetrates the first positioning hole 716 and is inserted into the first positioning groove 138b, and the other end of the positioning pin 780 penetrates the second positioning hole 726a and is inserted into the second positioning groove 739b, such that the cover plate 710, the injection valve 720, and the valve plate 730 of the injection valve assembly 700 may be aligned. In addition, the fastening bolt 770 penetrates the first fastening hole 739a and the second fastening hole 714 and is fastened to the fastening groove 138a, such that the injection valve assembly 700 may be fastened to the rear housing 130.

Meanwhile, when the injection valve assembly 700 is fastened to the rear housing 130, a first sealing member 740 may be interposed between the cover plate upper surface 710a and the third annular wall 138, and a second sealing member 750 may be interposed between the valve plate upper surface 730a and the cover plate lower surface 710b.

Meanwhile, the cover plate 710 may have a first groove 718 and a second groove 719.

The first groove 718 serves to reduce a contact area between the cover plate 710 and the head portion 722 of the injection valve 720 to reduce collision noise. The first groove 718 serves to capture and discharge foreign substances to prevent the foreign substances from being trapped between the cover plate 710 and the head portion 722 of the injection valve 720. The first groove 718 may have an annular shape that is recessed from the injection valve seating groove 710c and surrounds the inflow port 712. An inner peripheral portion of the first groove 718 may overlap an outer peripheral portion of the head portion 722 of the injection valve 720 in the axial direction, and an outer peripheral portion of the first groove 718 may not overlap the head portion 722 of the injection valve 720 in the axial direction. That is, an inner diameter of the first groove 718 may be smaller than an outer diameter of the head portion 722 of the injection valve 720, and an outer diameter of the first groove 718 may be larger than an outer diameter of the head portion 722 of the injection valve 720. This is to discharge foreign substances, which are captured in the first groove 718, to the inclined space 734.

The second groove 719 serves to capture and discharge foreign substances to prevent the foreign substances from being trapped between the cover plate 710 and the leg portion 724 of the injection valve 720. The second groove 719 may be recessed from the injection valve seating groove 710c and provided at a position facing the leg portion 724 of the injection valve 720. The second groove 719 may be provided in the form of a long hole. A central portion of the second groove 719 may overlap the leg portion 724 of the injection valve 720 in the axial direction, and two opposite ends of the second groove 719 may not overlap the leg portion 724 of the injection valve 720 in the axial direction. That is, a major axis direction of the second groove 719 may be parallel to a width direction of the leg portion 724 of the injection valve 720, and a length of the second groove 719 in the major axis direction may be larger than a width of the leg portion 724 of the injection valve 720. This is to discharge foreign substances, which are captured in the second groove 719, to the inclined space 734.

Next, the discharge valve 600 will be described in detail with reference to FIGS. 13 and 18 to 20. The discharge valve 600 is interposed between the fixed scroll 500 and the injection valve assembly 700 and serves to allow the discharge opening 512 and the discharge chamber D to communicate with each other or block the communication between the discharge opening 512 and the discharge chamber D.

Specifically, the discharge valve 600 may include a discharge reed plate 610 positioned on the fixed end plate 510 of the fixed scroll, and the gasket retainer 630 disposed between the rear housing 130 and the fixed scroll 500 while surrounding the discharge reed plate 610.

Figure 18:
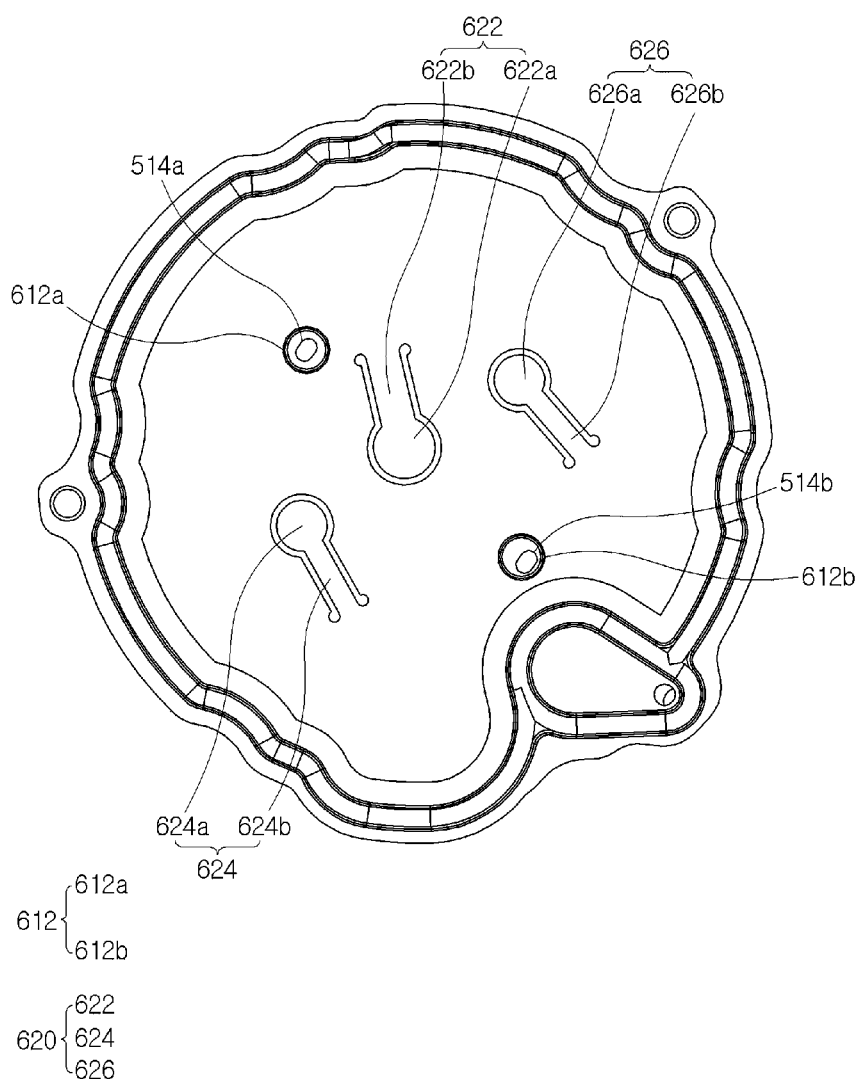
FIG. 18 is a front view illustrating the fixed scroll in a state in which a discharge reed plate among the components illustrated in FIG. 13 is disposed.

As illustrated in FIG. 18, the discharge reed plate 610 may be positioned in a partial region of the fixed end plate 510 and have a shape approximately similar to a shape of the fixed end plate 510. The discharge reed plate 610 includes the communication ports 612 configured to allow the outflow port 736 and the injection port 514 to communicate with each other, and reed parts 620 configured to open or close the discharge openings 512.

The communication ports 612 are formed to correspond to the positions of the injection ports 514. That is, the discharge reed plate 610 includes a first communication port 612a corresponding to the first injection port 514a, and a second communication port 612b corresponding to the second injection port 514b. In this case, an inner diameter of the communication port 612 may be equal to or larger than an inner diameter of the injection port 514 in order to prevent a loss of pressure and flow rate during a process in which the refrigerant flows from the injection valve assembly 700 to the injection port 514.

The reed part 620 serves to open or close the discharge opening 512 and is formed to correspond to the position of the discharge opening 512. That is, the discharge reed plate 610 has a main reed part 622 configured to open or close the main discharge opening 512a, a first sub reed part 624 configured to open or close the first sub-discharge opening 512b, and a second sub reed part 626 configured to open or close the second sub-discharge opening 512c. The reed parts 622, 624, and 626 may each have a head portion 622a, 624a, or 626a disposed to correspond to the position of the discharge opening 512 and configured to open or close the discharge opening 512, and a leg portion 622b, 624b, or 626b extending in one direction from the head portion 622a, 624a, or 626a. The head portion 622a, 624a, or 626a and the leg portion 622b, 624b, or 626b are formed by forming a cut-out portion in the discharge reed plate 610. The head portion 622a, 624a, or 626a may be provided in the form of a circular plate having an outer diameter larger than an inner diameter of the corresponding discharge opening 512. The leg portion 622b, 624b, or 626b may be provided in the form of a plate extending in one direction from the head portion 622a, 624a, or 626a. Therefore, the reed part 620 may be opened while moving toward the injection valve assembly 700 relative to the discharge reed plate 610 and allow the discharge opening 512 and the discharge chamber D to communicate with each other.

In this case, the reed part 620 may be formed in any direction on the discharge reed plate 610, which improves a degree of freedom related to position design. That is, it is easy to design the position of the reed part 620 so that the reed part 620 does not interfere with the communication port 612 corresponding to the position of the injection port 514.

The gasket retainer 630 is disposed on the fixed end plate 510 while surrounding the discharge reed plate 610. An outer peripheral portion of the gasket retainer 630 may have a shape corresponding to a groove formed in an outer peripheral portion of the fixed end plate 510, but the present disclosure is not limited thereto.

Figure 19:
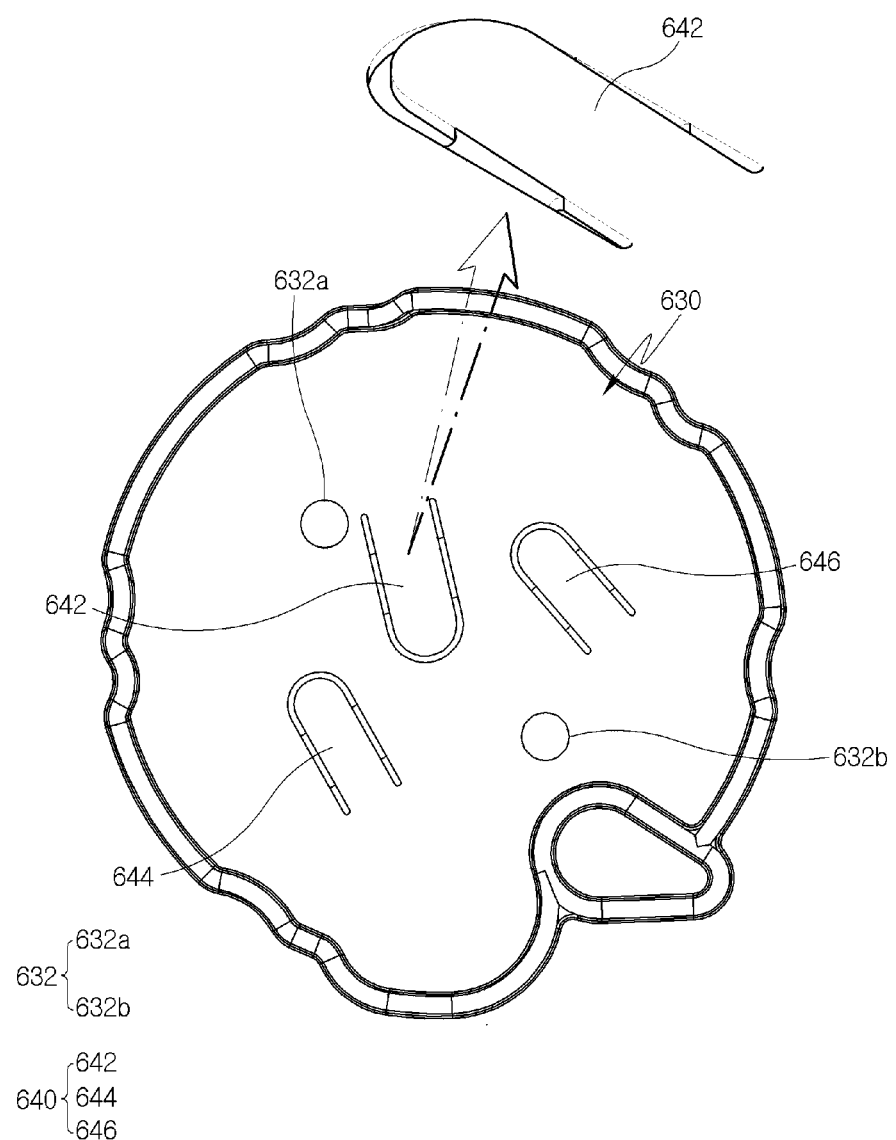
FIG. 19 is a front view illustrating a gasket retainer among the components illustrated in FIG. 13.

As illustrated in FIG. 19, like the discharge reed plate 610, the gasket retainer 630 may be provided in the form of a plate. The gasket retainer 630 has retainer parts 640 configured to guide or restrict positions at which the reed parts 620 are opened. The retainer part 640 is formed to correspond to the position of the reed part 620. That is, the gasket retainer 630 has a main retainer part 642 corresponding to the main reed part 622, a first sub retainer part 644 corresponding to the first sub-reed part 624, and a second sub retainer part 646 corresponding to the second sub-reed part 626. The retainer part 640 may be formed on the gasket retainer 630 and processed to be inclined. A predetermined inclination of the retainer part 640 may restrict the position at which the reed part 620 may be opened maximally.

The gasket retainer 630 may be fixed by being pressed against the fixed scroll 500 by the injection valve assembly 700 and the rear housing 130 without a separate fastening member for fixing the gasket retainer 630. Specifically, as illustrated in FIG. 3, an outer peripheral portion of the gasket retainer 630 is pressed against the fixed end plate 510 by the second annular wall 136 of the rear housing. An inner portion of the gasket retainer 630 is pressed against the fixed end plate 510 by the injection valve assembly 700.

Therefore, the discharge reed plate 610 may also be pressed and fixed together with the gasket retainer 630. The gasket retainer 630 is disposed to surround the discharge reed plate 610 and serves to seal a portion around the discharge reed plate 610. Moreover, the gasket retainer 630 is pressed between the fixed end plate 510 and the rear housing 130, particularly, between the fixed end plate 510 and the second annular wall 136 and seals a portion between the fixed end plate 510 and the rear housing 130, thereby preventing the refrigerant in the discharge chamber D from leaking. Therefore, there is no need for a separate sealing member for sealing the portion around the discharge reed plate 610 and sealing the portion between the fixed end plate 510 and the rear housing 130.

In this case, insertion ports 632 may be penetratively formed in the gasket retainer 630, and the protruding portions 732 of the valve plate 730 are at least partially inserted into the insertion ports 632. Particularly, the gasket retainer 630 may have a first insertion port 632a corresponding to the position of the first protruding portion 732a, and a second insertion port 632b corresponding to the position of the second protruding portion 732b. The first small diameter portion 732ab of the first protruding portion 732a may be inserted into the first insertion port 632a, and the second small diameter portion 732bb of the second protruding portion 732b may be inserted into the second insertion port 632b. To this end, an inner diameter of the first insertion port 632a may be equal in level to an outer diameter of the first small diameter portion 732ab, and an inner diameter of the second insertion port 632b may be equal in level to an outer diameter of the second small diameter portion 732bb.

Figure 20:
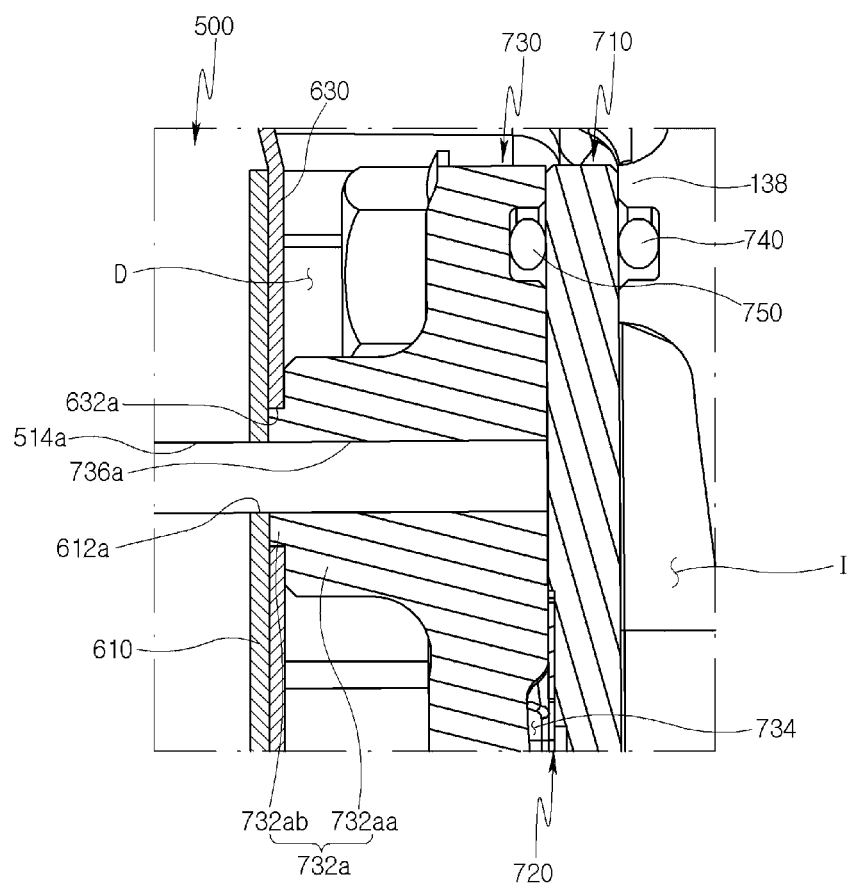
FIG. 20 is an enlarged cross-sectional view of part A illustrated in FIG. 3.

Therefore, as illustrated in FIG. 20, the communication port 612 and the outflow port 736 may communicate with each other as the small diameter portions 732ab and 732bb penetrate the gasket retainer 630 and come into contact with the discharge reed plate 610. In this case, the large diameter portions 732aa and 732ba come into contact with the gasket retainer 630 without penetrating the gasket retainer 630 and press the gasket retainer 630 against the fixed end plate 510, i.e., the discharge reed plate 610, thereby sealing the portion between the communication port 612 and the outflow port 736 to prevent the refrigerant from leaking. To this end, an axial length of each of the small diameter portions 732ab and 732bb may be equal to or shorter than an axial length of the insertion port 632.

However, the present disclosure is not limited thereto, the insertion port of the gasket retainer may serve to allow the communication port and the outflow port to communicate with each other.

In this case, when the pressure in the third compression chamber C3 reaches a level of a discharge pressure, the main reed part 622 opens the main discharge opening 512a. When the pressure in the second outer compression chamber C21 is higher than the second pressure range, the first sub-reed part 624 opens the first sub-discharge opening 512b to decrease the pressure in the second outer compression chamber C21 to a level included in the second pressure range. When the pressure in the second inner compression chamber C22 is higher than the second pressure range, the second sub-reed part 626 opens the second sub-discharge opening 512c to decrease the pressure in the second inner compression chamber C22 to a level included in the second pressure range. As a result, it is possible to prevent the pressure of the refrigerant discharged from the main discharge opening 512a from becoming excessively higher than the discharge pressure. That is, the excessive compression may be prevented.

Meanwhile, the first sub-discharge opening 512b and the second sub-discharge opening 512c may simultaneously communicate with the second outer compression chamber C21 and the second inner compression chamber C22 so that pressure imbalance does not occur between the second outer compression chamber C21 and the second inner compression chamber C22. That is, when the communication between the first sub-discharge opening 512b and the second outer compression chamber C21 is initiated, the communication between the second sub-discharge opening 512c and the second inner compression chamber C22 may be initiated.

Further, particularly, the first sub-discharge opening 512b and the second sub-discharge opening 512c may be blocked simultaneously with the second outer compression chamber C21 and the second inner compression chamber C22. That is, when the communication between the first sub-discharge opening 512b and the second outer compression chamber C21 is blocked, the communication between the second sub-discharge opening 512c and the second inner compression chamber C22 may be blocked.

Meanwhile, the fixed end plate 510 may have grooves that perform the same function as the first and second grooves 718 and 719 on the head and leg portions of the discharge valve 600.

Hereinafter, an operational effect of the scroll compressor according to the present embodiment will be described.

When power is applied to the motor 200, the rotary shaft 300 rotates together with the rotor 220, and the orbiting scroll 400 orbits by receiving a rotational force from the rotary shaft 300 through the eccentric bushing 310. Therefore, the compression chamber C moves consistently toward the center, such that a volume of the compression chamber C may be reduced.

Therefore, the refrigerant introduced into the compression chamber C may be compressed while moving toward the center along the movement route of the compression chamber C and discharged to the discharge chamber D through the discharge opening 512. The discharge-pressure refrigerant discharged to the discharge chamber D may be discharged to the outside of the compressor through the discharge port 131.

In this case, the suction-pressure refrigerant may flow into the compression chamber C through the suction port (not illustrated), the motor accommodation space S1, the suction flow path (not illustrated), and the scroll accommodation space S2.

In addition, the scroll compressor according to the present embodiment includes the injection flow path (the introduction port 133, the introduction chamber I, the injection valve assembly 700, the communication port 612, and the injection port 514) configured to guide the middle-pressure refrigerant to the compression chamber C. Therefore, the scroll compressor may compress and discharge the middle-pressure refrigerant as well as the suction-pressure refrigerant, such that the amount of refrigerant to be discharged may be further increased than when only the suction-pressure refrigerant is introduced, compressed, and discharged. Therefore, the performance and efficiency of the compressor may be improved.

In addition, the rear housing 130 includes the introduction port 133 and the introduction chamber I as well as the discharge chamber D and the discharge port 131. That is, the rear housing 130 having the discharge chamber D, the discharge port 131, the introduction port 133, and the introduction chamber I is integrally formed, such that the likelihood of the refrigerant is reduced, and the size, costs and weight may be reduced.

In addition, since at least a part of the introduction chamber I is accommodated in the discharge chamber D, the refrigerant guided to the injection port 514 may exchange heat with the refrigerant in the discharge chamber D through the third annular wall 138 and the injection valve assembly 700. That is, the refrigerant in the introduction chamber I and the refrigerant passing through the injection valve assembly 700 may be heated by receiving heat from the refrigerant in the discharge chamber D. Therefore, it is possible to prevent the liquid refrigerant from being injected into the compression chamber C through the injection port 514.

In addition, at least a part of the discharge port 131 is accommodated in the introduction chamber I, the refrigerant in the introduction chamber I may exchange heat with the refrigerant in the discharge port 131 through the wall portion of the discharge port 131 accommodated in the introduction chamber I. That is, the refrigerant in the introduction chamber I may be heated by receiving heat from the refrigerant of the discharge port 131. Therefore, it is possible to prevent the liquid refrigerant from being injected into the compression chamber C through the injection port 514.

In addition, since at least a part of the introduction port 133 is accommodated in the discharge chamber D, the refrigerant in the introduction port 133 may exchange heat with the refrigerant in the discharge chamber D through the wall portion of the introduction port 133 accommodated in the discharge chamber D. That is, the refrigerant in the introduction port 133 may be heated by receiving heat from the refrigerant in the discharge chamber D. Therefore, it is possible to prevent the liquid refrigerant from being injected into the compression chamber C through the injection port 514.

In addition, since the refrigerant in the discharge port 131 and the refrigerant in the introduction port 133 flow in a cross-flow direction, the refrigerant in the introduction port 133 may exchange heat with the refrigerant in the discharge port 131. That is, the refrigerant in the introduction port 133 may be heated by receiving heat from the refrigerant in the discharge port 131. Therefore, it is possible to prevent the liquid refrigerant from being injected into the compression chamber C through the injection port 514.

In the scroll compressor according to the present disclosure, the structure of the injection valve assembly is not limited to the above-mentioned embodiment. Not only the position of the injection port of the fixed scroll but also the positions of the communication port and the insertion port of the discharge valve may be changed depending on the position of the outflow port of the injection valve assembly according to various embodiments.

Further, the positions of the reed part and the retainer part of the discharge valve may be of course changed depending on the position of the discharge opening of the fixed scroll.

According to the present disclosure, not only the suction-pressure refrigerant but also the middle-pressure refrigerant are introduced into the compression chamber C of the scroll compressor, such that the amount of refrigerant to be discharged from the compression chamber may increase, which makes it possible to improve performance and efficiency of the compressor.

In addition, since the reed part of the discharge valve may be formed in any direction on the discharge reed plate, a degree of freedom related to position design of the reed part is high, and it is easy to prevent the reed part from interfering with the communication port.

The present disclosure is not limited to the specific exemplary embodiments and descriptions, various modifications can be made by any person skilled in the art to which the present disclosure pertains without departing from the subject matter of the present disclosure as claimed in the claims, and the modifications are within the scope defined by the claims.

The present disclosure relates to a scroll compressor, and more particularly, to a scroll compressor capable of compressing a refrigerant by using a fixed scroll and an orbiting scroll.

The invention claimed is:
1. A scroll compressor comprising:
   a housing;
   a motor provided in the housing;
   a rotary shaft configured to be rotated by the motor;
   an orbiting scroll configured to orbit in conjunction with the rotary shaft;
   a fixed scroll configured to define a compression chamber together with the orbiting scroll; and
   a discharge valve disposed on one surface of the fixed scroll and configured to open or close one or more discharge openings of the fixed scroll through which a refrigerant compressed in the compression chamber is discharged,
   wherein the discharge valve further comprises:
      a discharge reed plate disposed on one surface of the fixed scroll; and
      a gasket retainer disposed between one surface of the fixed scroll and the housing and configured to surround the discharge reed plate,
   wherein the housing further comprises:
      a center housing penetrated by the rotary shaft;
      a front housing configured to define a motor accommodation space together with the center housing, the motor accommodation space configured to accommodate the motor; and
      a rear housing configured to define a scroll accommodation space together with the center housing, the scroll accommodation space configured to accommodate the orbiting scroll and the fixed scroll, wherein an injection valve assembly is provided between the discharge valve and the rear housing and configured to open or close an injection flow path configured to guide a middle-pressure refrigerant to the compression chamber from outside of the housing, and wherein the rear housing further comprises:
- a first annular wall fastened to the center housing and configured to define the scroll accommodation space configured to accommodate the orbiting scroll and the fixed scroll;
- a second annular wall accommodated in the first annular wall and configured to define a discharge chamber configured to accommodate the refrigerant discharged from the compression chamber; and
- a third annular wall accommodated in the second annular wall and covered by the injection valve assembly, and wherein an outer peripheral portion of the gasket retainer is fixed by being pressed between the fixed scroll and the second annular wall.

2. The scroll compressor of claim 1, wherein the discharge reed plate has one or more reed parts configured to open or close the one or more discharge openings, respectively.

3. The scroll compressor of claim 2, wherein the one or more reed parts further comprises:
- a head portion disposed to correspond to a position of the one or more discharge openings and configured to open or close the one or more discharge openings; and
- a leg portion extending in one direction from the head portion.

4. The scroll compressor of claim 3, wherein the head portion and the leg portion are formed by forming a cut-out portion in the discharge reed plate.

5. The scroll compressor of claim 2, wherein the gasket retainer has one or more retainer parts processed to be inclined and disposed at positions corresponding to the one or more reed parts, respectively.

6. The scroll compressor of claim 5, wherein an inclination of the one or more retainer parts restricts a position at which the one or more reed parts are opened maximally.

7. The scroll compressor of claim 1, wherein the fixed scroll comprises one or more injection ports configured to guide the refrigerant to the compression chamber from one surface of the fixed scroll, and wherein the discharge reed plate has one or more communication ports penetratively formed to correspond to the one or more injection ports.

8. The scroll compressor of claim 7, wherein an inner diameter of the one or more communication ports is larger than an inner diameter of the one or more injection ports or equal to the inner diameter of the one or more injection ports.

9. The scroll compressor of claim 7, wherein the gasket retainer has one or more insertion ports penetratively formed to correspond to the one or more injection ports.

10. The scroll compressor of claim 9, wherein an inner side of the gasket retainer is fixed by being pressed toward the fixed scroll by the injection valve assembly.

11. The scroll compressor of claim 10, wherein the injection valve assembly further comprises:
- a cover plate configured to cover the third annular wall and having an inflow port into which the middle-pressure refrigerant is introduced;
- a valve plate coupled to one surface of the cover plate, which is adjacent to the discharge valve, and having an outflow port through which the refrigerant introduced into the inflow port is discharged toward the discharge valve; and
- an injection valve interposed between the cover plate and the valve plate and configured to allow the inflow port and the outflow port to selectively communicate with each other.

12. The scroll compressor of claim 11, wherein the valve plate further comprises a protruding portion protruding from one surface of the valve plate, which is adjacent to the discharge valve, toward the discharge valve and having the outflow port extending therein, and wherein at least a part of the protruding portion is inserted into the one or more insertion ports.

13. The scroll compressor of claim 12, wherein the protruding portion further comprises:
- a large diameter portion protruding from one surface of the valve plate, which is adjacent to the discharge valve, toward the discharge valve; and
- a small diameter portion protruding from the large diameter portion toward the discharge valve and having an outer diameter smaller than an outer diameter of the large diameter portion, and wherein the small diameter portion is inserted into the one or more insertion ports.

14. The scroll compressor of claim 13, wherein an axial length of the small diameter portion is shorter than an axial length of the one or more insertion ports or equal to the axial length of the one or more insertion ports.

15. The scroll compressor of claim 14, wherein the one or more communication ports communicates with the outflow port and the one or more injection ports.

* * * * *